United States Patent [19]

Ballu

[11] Patent Number: 4,936,483
[45] Date of Patent: Jun. 26, 1990

[54] RECEPTACLE WHICH CAN BE DISMANTLED AND WHICH CAN WITHSTAND AN INTERNAL PRESSURE

[75] Inventor: Patrick J. Ballu, Reims, France
[73] Assignee: Tecnoma, France
[21] Appl. No.: 298,695
[22] Filed: Jan. 19, 1989

[30] Foreign Application Priority Data

Jan. 20, 1988 [FR] France .................. 88 00590

[51] Int. Cl.⁵ .............................................. B65D 53/00
[52] U.S. Cl. ..................................... 220/240; 220/378; 220/80
[58] Field of Search .................. 220/3, 5 A, 240, 378, 220/315, 316, 319, 80

[56] References Cited

U.S. PATENT DOCUMENTS

| | | |
|---|---|---|
| 2,439,910 | 4/1948 | Snyder . |
| 3,214,054 | 10/1965 | Poethig et al. . |
| 3,990,605 | 11/1976 | Hanke et al. .............. 220/316 |
| 4,247,015 | 1/1981 | Straub ......................... 220/3 |
| 4,267,940 | 5/1981 | Wade ......................... 220/5 A |
| 4,308,971 | 1/1982 | Straub ......................... 220/3 |
| 4,444,331 | 4/1984 | Lankston ................... 220/316 |

FOREIGN PATENT DOCUMENTS 2328918 10/1976 France .
540036 10/1941 United Kingdom .

*Primary Examiner*—Joseph Man-Fu Moy
*Attorney, Agent, or Firm*—Watson, Cole, Grindle & Watson

[57] ABSTRACT

The invention relates to a receptacle which can be dismantled into two elements and can withstand an internal pressure, preferably made from plastic which is impossible or difficult to dismantle the receptacle when it is under pressure. The receptacle comprises a male element which partially penetrates into a female element. The female element bears, on its outer face, attachment means, for example a male thread designed to cooperate with attachment means such as a female thread carried by a connecting member such as a ring fixed to the male element for the purposes of axial translation. When the pressure is applied to the receptacle, the latter deforms until the attachment means lock, in particular by jamming.

14 Claims, 3 Drawing Sheets

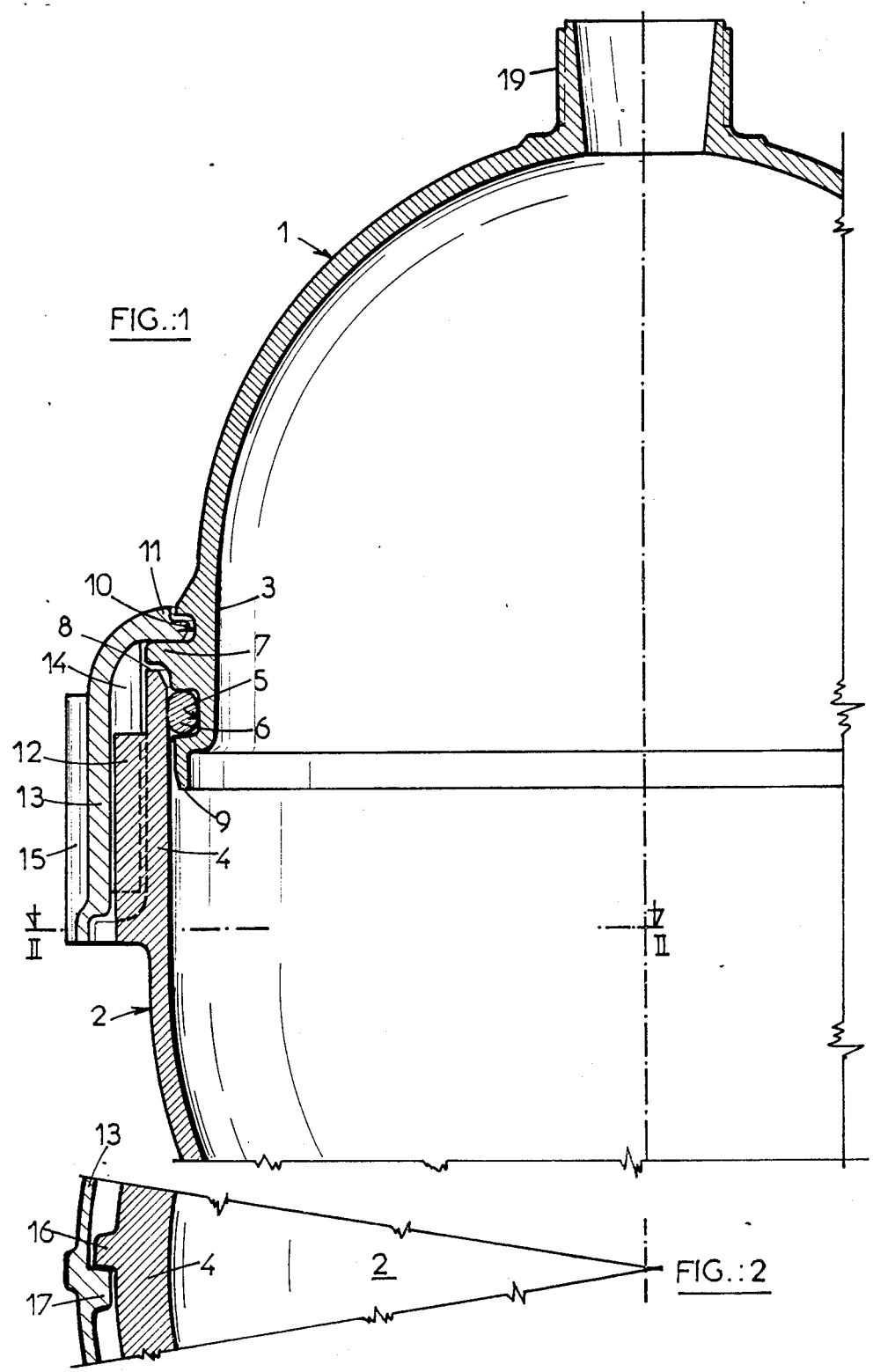

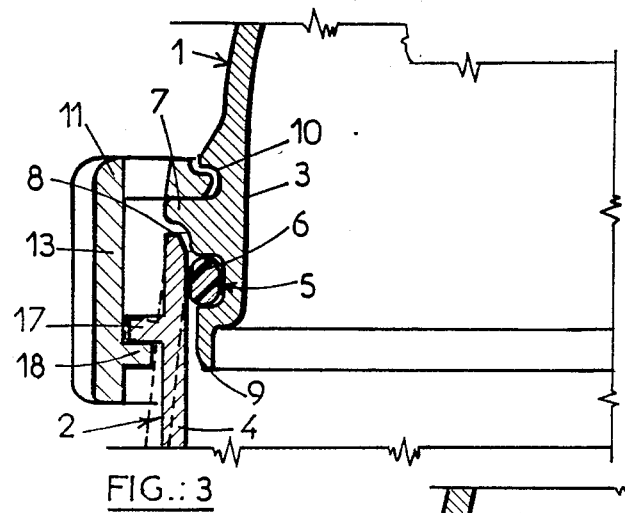
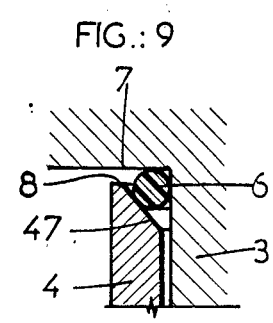
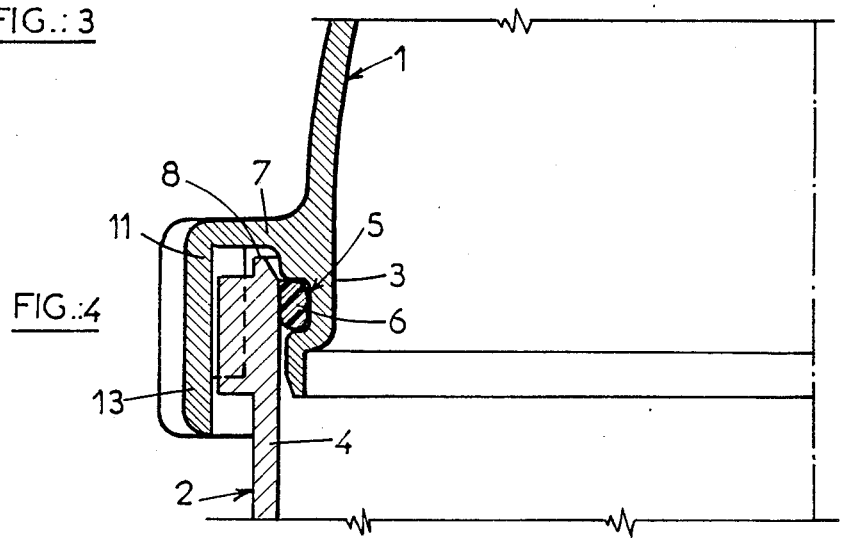
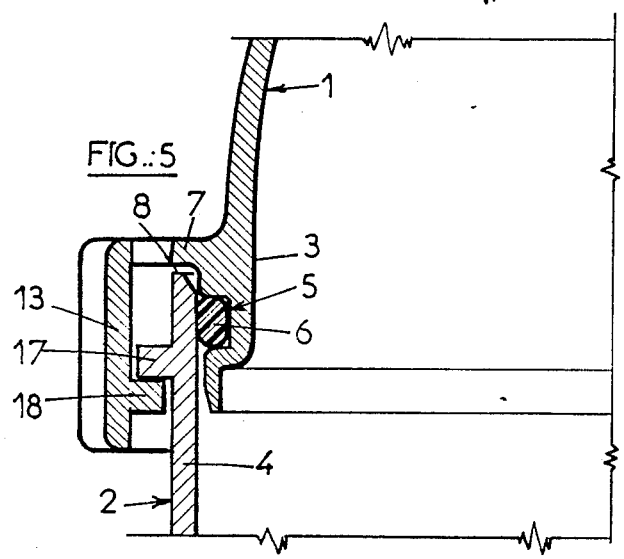
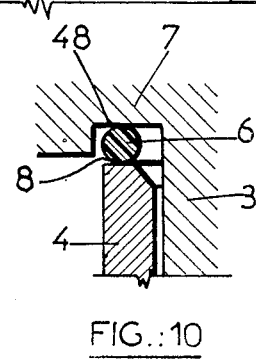

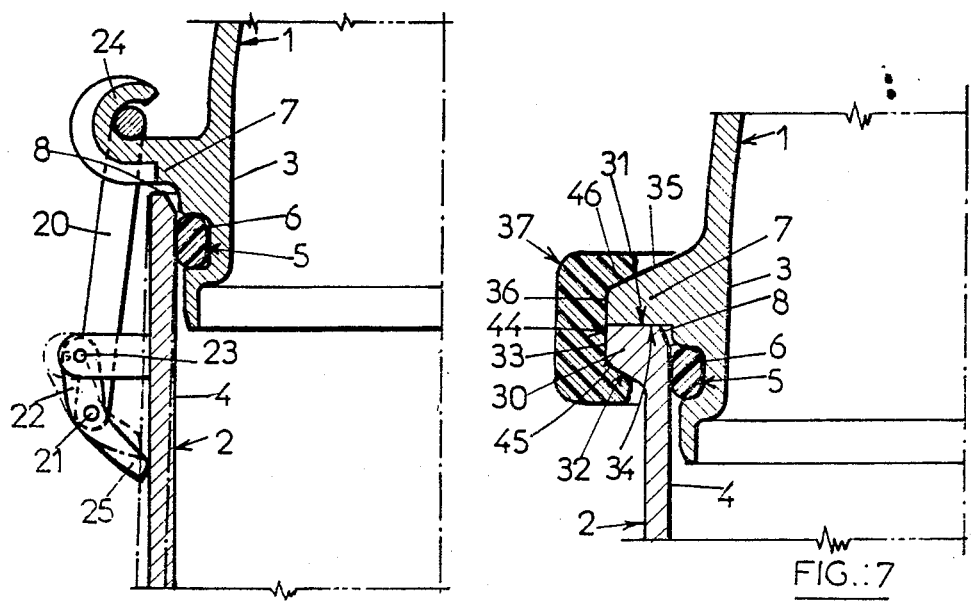
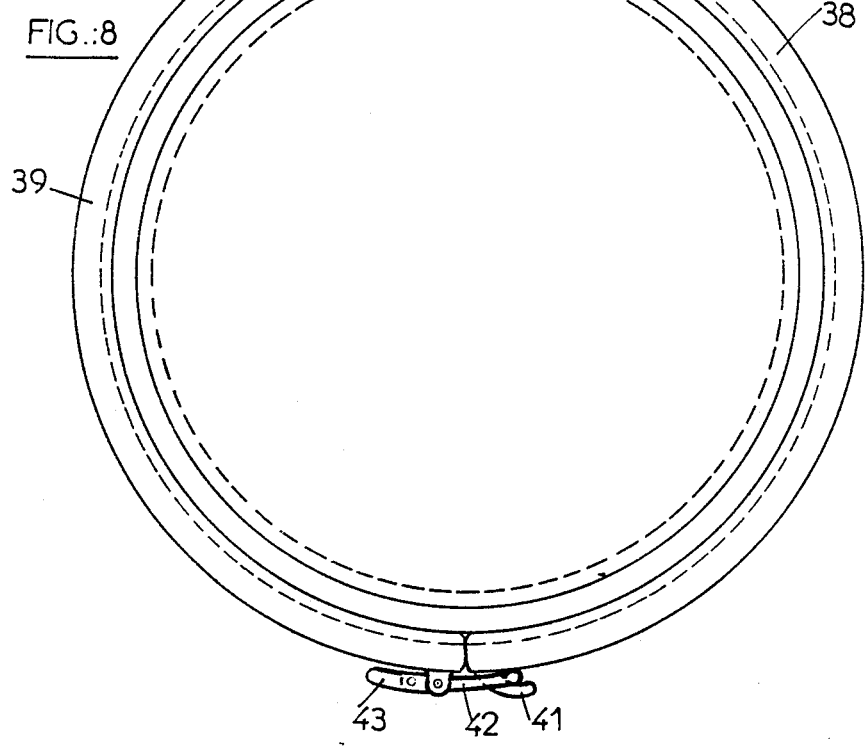

RECEPTACLE WHICH CAN BE DISMANTLED AND WHICH CAN WITHSTAND AN INTERNAL PRESSURE

The present invention relates to a receptacle which can be dismantled into two elements, intended to withstand an internal pressure and comprising a first element whereof a cylindrical part penetrates into a cylindrical part of a second element, and a gasket interposed between these two cylindrical parts.

When the line of junction between two elements of a receptacle which resists pressure and is in two parts possesses a substantial length, recourse is often had to a joint by means of parallel flanges between which a seal is interposed. This arrangement is safe but heavy and cumbersome and the operations of assembling and dismantling the receptacle are long. This is particularly the case when the receptacle, which is for example cylindrical, possesses two bases which may or may not be curved, and two elements joined at the part of maximum diameter, for example to facilitate inspection and cleaning. One or both of the two elements may possess blockable apertures of smaller diameter for filling or emptying, the blocking of these apertures generally presenting less acute problems.

Receptacles which can be dismantled and which rely on the penetration of the cylindrical part (male part) into another (female part) are less heavy and cumbersome, owing to the absence of the flanges, which do not play a part in restricting the interior space of the receptacle. Above all they have the advantage of permitting rapid assembly and dismantling. On the other hand, they possess the danger, inherent in rapid dismantling, that this dismantling will take place when the receptacle is still under pressure, which can cause accidents. Moreover, they are relatively sensitive to deformation under the action of pressure, and if these deformations become permanent, they may hinder subsequent dismantling and re-assembly.

These latter disadvantages are relatively infrequent with rigid receptacles, and particularly metal receptacles, but they become more apparent with receptacles of flexible materials, such as plastics, which are being used increasingly.

The object of the invention is to provide a receptacle of the type indicated above which permits rapid assembly and dismantling while preventing dismantling of the receptacle when it is under pressure.

Another object of the invention is to provide such a receptacle whose possibilities for rapid dismantling and assembly are not adversely affected by extended use under pressure, resulting in distortion of the material.

Another object of the invention is to provide such a receptacle which is simple and inexpensive to manufacture, preferably from plastic.

In order to achieve these objects, the invention provides a receptacle which can be dismantled and is intended to withstand an internal pressure, comprising a male element whereof a cylindrical part penetrates into a cylindrical part of a female element, and a gasket interposed between these two cylindrical parts, wherein the outer surface of the female element bears attachment means designed to cooperate with attachment means provided on a connecting member fixed to the male element for the purposes of axial translation, and wherein the thickness of the female element is calculated such that, when the said internal pressure is applied to the receptacle, the latter deforms in order to make it impossible to actuate the attachment means with a view to opening the receptacle.

According to the invention, therefore, there is separation between the sealing members and the attachment members: the internal face of the female element is in contact with the gasket, while it is the external face thereof which carries the attachment members. This provides the possibility, while allowing great freedom for the top of the receptacle, of preventing the pressure from causing undesirable effects in relation to the leaktightness while achieving the desired effects in relation to security.

According to an advantageous embodiment, the distance between the attachment means carried by the female element and the edge of this element is greater than the distance between the gasket and the same edge of the female element.

In this manner, the amplitude of the deformation is greater at the position of the attachment means, where it is useful, than at the position of the gasket where it is undesirable.

According to a first embodiment of the invention, the attachment means carried by the female element are constituted by a male thread calculated to cooperate freely with a female tapping carried by the connecting member when the internal pressure is low or zero, and to jam in said female tapping when the internal pressure is high. In this case, it is advantageous to provide at least one stop which restricts the screwing of the connecting member onto the thread of the female element.

This last precaution makes it possible always to have easy dismantling, even after an extended period of subjection to pressure, which would not be the case with screwing limited by the arrival of the end of the thread, especially if the material has undergone distortion caused by pressure.

According to a second embodiment of the invention, which is less reliable, especially for large dimensions and serious deformations, but is easier to produce and permits even more rapid assembly and dismantling, the attachment means form an assembly of the bayonet type and comprise, on the female element, projections directed radially outward and calculated to interact with an appropriate relief of the connecting member, this connecting member further comprising at least one bearing surface which is gripped against an outer surface of the female element when the latter is deformed by the pressure.

According to a third embodiment of the invention, which is a little more complicated but better adapted to large-dimension receptacles, the attachment means carried by the female element comprise a locking system comprising at least one flange articulated on a lever which is itself articulated on the female element, the flange interacting with a hook carried by the connecting member, the relative immobilization of the elements being obtained by the lever passing a zero point, the deformation of the female element under the action of the pressure entailing an increase in the extent by which the zero point is passed. Preferably, the deformation of the female element under the action of the pressure displaces the end of the lever which is opposite to its articulation on the female element and brings this end closer to the female element or clamps it against the latter, making it difficult or impossible to actuate said lever when the receptacle is under pressure.

As regards the connecting member, according to a first alternative embodiment, it is formed by a ring which can rotate about the cylindrical part of the male element. It is possible to arrange for there to be, between the connecting member and the male element, sufficient play for the deformations of the latter to have no effect on the connecting element. According to another alternative embodiment, the connecting member is a skirt fixed to the male element. This embodiment makes it possible to mould the male element and the connecting element in a single operation. On the other hand, it is more difficult to ensure that the deformations of the male element do not envelop the connecting member.

The invention can also be embodied in a different manner, which is particularly suited to receptacles of very large diameter under relatively moderate pressure. In this case, provision is made for the attachment means carried by the male element to consist of a radial ribbing along the edge of this element, the connecting member is constituted by a circular grooved flange which encompasses said ribbing and a similar ribbing of the male element, this flange possessing at least one break in its periphery, the two sides of this break being joined by a clamping system which locks when the peripheral length of the flange increases under the action of internal pressure. Preferably, the clamping system comprises a flange articulated on a lever which is itself articulated on a first section and a hook carried by the other section, the relative immobilization of the male and female elements being obtained by the lever passing a zero point, the deformation of the female element, and possibly of the male element, under the action of the pressure entailing an increase in the extent by which the zero point is passed. Advantageously, the deformation of the female element under the action of the pressure displaces the end of the lever which is opposite to its articulation on the first section and brings this end closer to said first section or clamps it against the latter, making it difficult or impossible to actuate said lever when the receptacle is under pressure.

Preferably also, the circular flange is in a plurality of articulated sections, especially if the receptacle has a large diameter.

The invention will now be explained in a more detailed manner with the aid of examples illustrated by the drawings, in which:

FIG. 1 is a partial axial section of a receptacle according to the invention,

FIG. 2 is a partial cross-section along the line 2—2 in FIG. 1,

FIGS. 3 to 7 are partial sections analogous to that in FIG. 1, which are diagrammatic and relate to alternative embodiments, FIG. 8 is an axial diagrammatic view of the device in FIG. 7, on a smaller scale.

FIGS. 9 and 10 are partial axial sections showing alternative arrangements of the gasket.

The receptacle in FIG. 1 is formed of two elements 1, 2, which are each formed by a hemispherical part extended by a cylindrical part. The external diameter of the cylindrical part 3 of the element 1 is slightly less than the internal diameter of the cylindrical part 4 of the element 2. The element 1 thus constitutes the male element and the element 2 the female element.

The cylindrical part of the male element possesses a radial groove 5 which contains an annular seal 6, which, when the two elements are assembled, is clamped against the cylindrical part 4 and constitutes the gasket.

The cylindrical part 3 further possesses an annular ribbing 7, projecting outward, and constituting a stop which limits the penetration of the male element 1 into the female element 2, coming to bear against the edge 8 of the female element. This ribbing is, of course, at a distance from the edge 9 of the male element which is greater than that of the groove 5.

Beyond the ribbing 7, starting from the edge 9, is a second annular channel 10, open towards the outside, in which is mounted, by a snap lid, a ring 11 which constitutes the connecting member. This ring 11 cannot escape from the channel 10, but can however rotate freely about the element 1. The interior face of the cylindrical part 4, which comes into contact with the gasket 6, is smooth and continuous. The exterior face of this cylindrical part 4 carries a thread 12 which extends as a whole at a distance from the edge 8 of the cylindrical part 4 which is greater than the distance of the annular seal 6 from the stop ribbing 7. This thread 12 is, necessarily, a male thread.

The ring 11 has, in section, a curved shape with a radially orientated part which penetrates into the ribbing 10 and a cylindrical part which extends parallel to the cylindrical part 3 and, when the two elements are assembled, to the cylindrical part 4. This cylindrical part 13 carries on its axially inward face a tapping 14 designed to interact with the thread 12 carried by the female element. On its exterior face the part 13 carries axial ribbings 15, intended to facilitate its entrainment in rotation.

As better shown by FIG. 2, the cylindrical part 4 carries, below the threading 12, that is to say beyond the latter starting from the edge 8, a stop 16 oriented radially outwards. Towards its edge further from the channel 10, the ring 11 carries a stop 17 orientated radially inwards. In the course of the screwing of the ring 11 onto the thread 12, the stops 16 and 17 meet, which interrupts the screwing, substantially before the end of the thread is reached.

The operation of the locking system will be explained, for reasons of clarity, with reference to FIG. 3 which will now be described.

FIG. 3 shows the same elements as FIG. 1, and it is therefore not necessary to describe them again. However, the threads 12 and 14 carried by the cylindrical part 4 and by the ring 11 have been eliminated. In their place, the cylindrical part 4 carries series of radial projections 17, oriented outwards, while the cylindrical part 13 of the ring 11 carries a series of radial projections 18 oriented inwards. The projections 17 are fragments of a complete radial channel, as are the projections 18. The intervals separating the projections 17 are greater, in angular extension, than the angular extension of the projections 18, and vice versa. When the receptacle is assembled, the projections 18 are beyond the projections 17 relative to the edge 8 of the female element, so that the whole constitutes an assembly of the well-known "bayonet" type. In FIG. 3, broken lines have been used to show, in an approximate and diagrammatic manner, the deformation undergone by the elements 1 and 2 when the receptacle is under pressure. The cylindrical part 4 of the female element 2 deforms slightly in the region neighbouring its edge 8. In fact, this edge, being isolated from the interior of the receptacle by the gasket 6 is not subjected to pressure. On the other hand, the cylindrical part dilates more and more markedly as it moves away from this edge 8. As the projections 17 are further from the edge 8 than the gasket 6 is, they move perceptibly away from the axis xx' of the receptacle, and the outer surface of the cylindrical part 4 comes to bear against the internal edge of the projections 8, which creates frictional forces which supplement those resulting from the contact between the adjacent projections 17 and 18. The ring 11 is thus immobilized in rotation relative to the female element 2. It will be noted that, instead of its being the external face of the cylindrical part 4 which comes to bear on the projections 18, it may be the interior face of the cylindrical part of the ring which comes into contact with the projection 17. The result is the same.

In the case of FIG. 1, the situation occurs in the safe manner. It is however necessary to note that a relatively slight displacement of the cylindrical part 4 carrying the thread 12 entails an effective clamping of the threads of the latter against the thread 14 carried by the ring 11. Virtually perfect locking is thus obtained for a relatively slight deformation.

FIGS. 4 and 5 show arrangements analogous to FIGS. 1 and 3 respectively, the difference relating to the fact that the ring 11, instead of rotating freely in a channel 10 of the male element, is fixed to the latter and is thus configured as a skirt. This arrangement is less expensive but it may make it necessary, in order to carry out assembly and dismantling of the receptacle to remove the lines which may, for example, be fitted on a connector 19 (FIG. 1) of one or other of the elements 1 or 2. Moreover, the deformation of the element 1 under the action of the pressure may have repercussions on the ring 11 so that under the same conditions the clamping risks being less effective.

The FIG. 6 shows another assembly device, comprising a flange 20, connected by an articulation 21 to a lever 22 which is itself connected by an articulation 23 to the cylindrical part 24. The flange 20 interacts with a hook 24 carried by the bead 7. When the lever 22 is lowered, in terms of the figure, a zero point is passed and the assembly is immobilized. This is a type of fixing which has long been known, but its special feature resides in the fact that the articulation 23 is carried by a cylindrical part 4 which is deformable. As has been indicated in dot-and-dash lines, the part 4 deforms under the action of the pressure, the arrangement of the lever 22 gears up the displacement, and the end 25 of the lever opposite the articulation 23 comes to bear firmly against the cylindrical part 4 which makes it difficult or impossible to raise the lever, and hence to dismantle the assembly, while the receptacle is under pressure. In order to make it even more difficult to raise the lever, it is possible to arrange for the exterior face of the part 4 to possess a relief such that it is, for example, impossible to engage the fingers under the lever 22 when it is firmly applied against this part 4.

Of course, to obtain complete solidarity between the elements 1 and 2, it is necessary to provide a plurality of devices analogous to that which is described in FIG. 6, preferably distributed equally along the periphery of the elements 1 and 2. One of these devices can be replaced by an articulation having a tangential axis, which articulation may, if desired, by detachable.

FIGS. 7 and 8 relate to an embodiment of the receptacle according to the invention which differs somewhat from the preceeding embodiments. The cylindrical part 3 again possesses the female element 1, the groove 5 which contains the gasket 6, and the exterior stop rim 7. The cylindrical part 4 of the female element 2 possesses, as previously, a smooth internal surface, but it lacks attachment members farther from its edge 8 than the gasket 6. The attachment means for the female part are constituted by a rib 30 orientated radially outward, and adjacent to the edge 7. This rim possesses a plane surface 31 on the side facing the male element, a conical surface 32 on the opposite side, and a cylindrical external surface 33. The rim 7 of the male element possesses, in a symmetrical manner, a plane surface 34 on the side facing the female element, a conical surface 35 on the opposite side and a cylindrical external surface 36. The plane surfaces 31, 34 bear against one another when the receptacle is closed and the cylindrical external surfaces 33 and 36 then form an extension. The attachment member is constituted by a circular flange 37 in two sections 38, 39, each extending approximately in a semicircle and connected at one of their ends by an articulation 40 and at the other by a system comprising a hook 41, a flange 42 and an articulated lever 43. This system is identical in its structure and its operation to that which was described in relation to FIG. 6 and it is not necessary to explain them in greater detail.

In section, the flange 37 possesses, on its internal face, a channel of trapezoidal section having a cylindrical base 44 and two conical sides 45, 46 of a conicity adapted to that of the conical surfaces 32 and 35 of the rim 30 and of the rim 7. The radius of the cylindrical base 44 is equal to that of the conical surfaces 33 and 36. The flange 37 is of a deformable material, and more precisely it is capable of elongating substantially in the peripheral direction under the action of a radial stress directed outward.

When the receptacle is put under pressure, the interaction of the conical surfaces 32 and 35 with the conical sides 45, 46 maintains the male and female elements in position, although the swelling of the receptacle corresponds to an increase in the radius of the cylindrical surfaces 33 and 36, and consequently of the cylindrical base 44. The result is a peripheral elongation of the flange 37 and consequently an increase in the clamping of the lever 43, in the same manner as indicated above in connection with the lever 25.

It should noted that the arrangement described can encompass a plurality of alternative embodiments:

one of the conical surfaces 32, 35, or both, may be plane, the corresponding side or sides 45, 46 likewise being plane, the flange 37 may be in more than two sections, or alternatively in a single section, the connections between the sections may as desired be articulations, hook systems or connections of other types, on condition that there is at least one hook system of the type described, or a system producing the same result, namely locking when the receptacle is under pressure, among those systems which produce the same result there may be mentioned, by way of example, screw or bayonet systems operating in accordance with the principles expounded in connection with FIGS. 1 or 3, the ends of the adjacent sections playing the part of the cylindrical parts 2 and 4 in those figures.

In FIGS. 1 and 3 to 7, the gasket 6 is accommodated in a groove 5 of the exterior face of the cylindrical part 3, and comes to bear against the interior face of the cylindrical part 4. It is clear that the groove could be provided on the part 4, or on both. In order to avoid the presence of such grooves, which may weaken the wall, it is possible to arrange, as shown in FIG. 9, that the gasket 6 is disposed in a manner such as to be gripped between the cylindrical wall 3 and its ribbing 7 on the one hand and the chamfer 47 of the edge 8 of the cylindrical part 4. It is also possible to arrange, as indicated in FIG. 10, that the gasket 6, accommodated in an annular channel 48 of the plane face of the ribbing 7 is gripped between the latter and the plane face of the edge 8. It will be noted that the arrangement of FIGS. 1 and 3 to 7 can tolerate slight relative axial displacements of the male and female elements, which is not permitted by the arrangements of FIGS. 9 and 10, where the maintenance of leaktightness requires a very rigid attachment. The embodiment of FIG. 9, perhaps the least secure in respect in respect of leaktightness, corresponds on the other hand to shapes which are particularly easy to obtain.

I claim:

1. A receptacle capable of being dismantled and being intended to withstand internal pressure, comprising cup-shaped male and female elements each having a cylindrical part, the cylindrical part of said male element extending into the cylindrical part of said female element in an assembled condition, a gasket disposed between said parts, first attachment means on the outer surface of said female element, a connecting member connected to said male element and having second attachment means in engagement with said first attachment means in said assembled condition, said female element having a predetermined wall thickness permitting said female element to radially outwardly deform in response to internal pressure at said first attachment means thereof for enhancing interengagement with said second attachment means for thereby avoiding disassembly of said parts.

2. The receptacle according to claim 1, wherein said first attachment means is spaced a first distance from an edge of said female element, said gasket being spaced a second distance from said edge which is less than said first distance.

3. The receptacle according to claim 1, wherein said first attachment means comprise radially outwardly extending projections, said second attachment means including reliefs receiving said projections, and said connecting member having a bearing surface engaging an outer surface of said female element when deformed by the internal pressure.

4. The receptacle according to claim 3, wherein said projections comprise male thread elements, and said reliefs comprise cooperating female thread elements.

5. The receptacle according to claim 3, wherein said projections and said reliefs together form an assembly of the bayonet-type.

6. The receptacle according to claim 4, wherein said parts have cooperating stops to limit the extent of the threaded engagement.

7. The receptacle according to claim 1, wherein said male member has a hook, said connecting member comprising a flange engaging said hook, said second attachment means comprising a lever pivotally connected to said flange and to said first attachment means and having an end bearing against an outer surface of said female element.

8. The receptacle according to claim 1, wherein said male element has a first radially extending annular rim, and said connecting member comprises a ring in engagement with said rim in said assembled condition.

9. The receptacle according to claim 1, wherein said connecting member comprises a skirt integrally connected to said male element.

10. The receptacle according to claim 8, wherein said first attachment means comprises a second radially extending annular rim in engagement with said first rim, said ring having an annular groove receiving said rims, and said ring comprising cooperating ring sections, clamp means clamping said sections together.

11. The receptacle according to claim 10, wherein said clamp means comprises a hook on one of said sections, a flange engaging said hook pivotally connected to the other of said sections, and a lever pivotally connected to said flange and to said other section for tightening the engagement between said hook and said flange.

12. The receptacle according to claim 1, wherein one of said cylindrical parts has an annular open groove, said gasket being located in said groove.

13. The receptacle according to claim 1, wherein said male element has an annular rib adjacent said cylindrical part thereof, and an end of said female element being chamfered, said gasket being located between said rib, said part of said male element and said chamfered end.

14. The receptacle of claim 1, wherein said male element has an annular groove adjacent said cylindrical part thereof, said gasket being located in said groove and bearing against an end of said female part.

* * * * *